US012192689B2

(12) United States Patent
Lotter

(10) Patent No.: US 12,192,689 B2
(45) Date of Patent: Jan. 7, 2025

(54) SYSTEMS AND METHODS FOR PROVIDING ENVIRONMENTAL DATA TO FIRST RESPONDERS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 17/141,180

(22) Filed: Jan. 4, 2021

(65) Prior Publication Data

US 2022/0103914 A1   Mar. 31, 2022

Related U.S. Application Data

(63) Continuation-in-part of application No. 16/853,646, filed on Apr. 20, 2020.

(60) Provisional application No. 63/009,887, filed on Apr. 14, 2020, provisional application No. 62/836,548, filed on Apr. 19, 2019.

(51) Int. Cl.
*H04Q 9/00* (2006.01)
*H04W 4/90* (2018.01)

(52) U.S. Cl.
CPC .............. *H04Q 9/00* (2013.01); *H04W 4/90* (2018.02); *H04Q 2209/10* (2013.01); *H04Q 2209/40* (2013.01)

(58) Field of Classification Search
CPC .................................. H04Q 9/00; H04W 4/90
See application file for complete search history.

(56) References Cited

U.S. PATENT DOCUMENTS

| 2003/0234725 | A1 | 12/2003 | Lemelson et al. |
| 2006/0125630 | A1 | 6/2006 | Parkulo |
| 2007/0096901 | A1 | 5/2007 | Seeley et al. |
| 2007/0103292 | A1 | 5/2007 | Burkley et al. |
| 2010/0280796 | A1* | 11/2010 | Ramin ............... H05K 7/20836 702/188 |
| 2010/0280836 | A1* | 11/2010 | Lu .......................... G08B 7/062 705/1.1 |

(Continued)

FOREIGN PATENT DOCUMENTS

| WO | 2018220620 A1 | 12/2018 |
| WO | 2019204205 A1 | 10/2019 |

OTHER PUBLICATIONS

International Search Report and Written Opinion for PCT/US2020/029025, dated Jul. 17, 2020, 9 pages.

(Continued)

*Primary Examiner* — Amine Benlagsir
(74) *Attorney, Agent, or Firm* — FisherBroyles LLP; James P. Cleary

(57) ABSTRACT

Systems and methods for providing situational awareness of a building to first responders are described. The system includes a server that receives and stores building information, such as a floor plan and other information. The system further includes one or more environmental sensors that sense environmental conditions within the building and uploads that information to the server. A building identification affixed to the building allows a first responder to access the building information and situational awareness information at any time, such as during a situation or an incident, such as an emergency.

20 Claims, 5 Drawing Sheets

(56) References Cited

U.S. PATENT DOCUMENTS

| | | | |
|---|---|---|---|
| 2013/0053063 A1* | 2/2013 | McSheffrey | G08B 7/066 455/456.1 |
| 2013/0147627 A1* | 6/2013 | Svenning | G08B 17/06 340/584 |
| 2013/0151979 A1 | 6/2013 | Snider et al. | |
| 2013/0157559 A1* | 6/2013 | Flammer, III | G08B 21/12 455/7 |
| 2013/0162534 A1 | 6/2013 | Chen et al. | |
| 2013/0268127 A1 | 10/2013 | Casilli et al. | |
| 2014/0278060 A1 | 9/2014 | Kordari et al. | |
| 2015/0046582 A1 | 2/2015 | Gelvin et al. | |
| 2015/0091757 A1 | 4/2015 | Shaw et al. | |
| 2015/0365246 A1 | 12/2015 | Kane | |
| 2016/0119424 A1 | 4/2016 | Kane et al. | |
| 2016/0180663 A1* | 6/2016 | McMahan | G08B 7/062 340/691.6 |
| 2016/0210790 A1* | 7/2016 | Rasane | G06Q 10/06 |
| 2016/0295495 A1* | 10/2016 | Lotter | H04W 40/22 |
| 2016/0298969 A1 | 10/2016 | Glenn, III et al. | |
| 2017/0230930 A1* | 8/2017 | Frey | H04W 64/003 |
| 2017/0264604 A1 | 9/2017 | Drako et al. | |
| 2017/0311131 A1 | 10/2017 | South et al. | |
| 2018/0054713 A1 | 2/2018 | South et al. | |
| 2018/0139517 A1 | 5/2018 | Schwartz et al. | |
| 2018/0356241 A1* | 12/2018 | Correnti | G01C 21/3461 |
| 2019/0096232 A1* | 3/2019 | Wedig | H04N 7/185 |
| 2019/0149664 A1 | 5/2019 | Wojtunik | |
| 2019/0174208 A1 | 6/2019 | Speicher et al. | |
| 2019/0295207 A1 | 9/2019 | Day et al. | |
| 2019/0295386 A1* | 9/2019 | Roberts | H02J 9/065 |
| 2019/0370805 A1* | 12/2019 | Van Os | G06Q 20/40 |
| 2019/0372650 A1* | 12/2019 | Takii | H04B 7/0874 |
| 2020/0100246 A1* | 3/2020 | Stefanik | H04W 72/1284 |
| 2020/0274626 A1* | 8/2020 | Leaf | H04B 17/16 |
| 2020/0334470 A1 | 10/2020 | Abeykoon et al. | |
| 2020/0334778 A1 | 10/2020 | Lotter | |

OTHER PUBLICATIONS

Non Final Office Action dated Nov. 1, 2019 for U.S. Appl. No. 16/442,383, 12 pages.
Final Office Action dated May 15, 2020 for U.S. Appl. No. 16/442,383, 14 pages.
Advisory Action dated Aug. 27, 2020 for U.S. Appl. No. 16/442,383, 3 pages.
Non-Final Office Action dated Sep. 30, 2020 for U.S. Appl. No. 16/442,383, 17 pages.
Notice of Allowance dated Jan. 21, 20221 for U.S. Appl. No. 16/442,383, 8 pages.
International Search Report and Written Opinion dated Aug. 30, 2019 for International Application No. PCT/US2019/037381, 9 pages.
International Preliminary Report on Patentability dated Dec. 24, 2020 for International Application No. PCT/US2019/037381, 7 pages.
International Preliminary Report on Patentability dated Oct. 28, 2021 for International Application No. PCT/US2020/029025, 8 pages.
Holmberg, et al., "Delivering Building Intelligence to First Responders", National Institute of Standards and Technology Technical Note 1648, U.S. Department of Commerce, Feb. 2013, 20 pages.
Non Final Office Action dated Jul. 7, 2022 for U.S. Appl. No. 16/853,646, 18 pages.
International Search Report and Written Opinion dated Mar. 28, 2022 for International Application No. PCT/US2022/011167, 11 pages.
International Search Report and Written Opinion dated Dec. 8, 2022 for International Application No. PCT/US2022/037681, 10 pages.
European Patent Office; "Extended European Search Report" dated Nov. 12, 2024; EPO Application No. 22734842.2; pp. 1-11 (2024).

* cited by examiner

SYSTEMS AND METHODS FOR PROVIDING ENVIRONMENTAL DATA TO FIRST RESPONDERS

CROSS-REFERENCE TO RELATED APPLICATIONS

The present application is a continuation in part of U.S. application Ser. No. 16/853,646, filed Apr. 20, 2020, and entitled "SYSTEMS AND METHODS FOR PROVIDING SITUATIONAL AWARENESS TO FIRST RESPONDERS", that claims the benefit of U.S. Provisional Application No. 63/009,887, filed Apr. 14, 2020, and entitled "SYSTEMS AND METHODS FOR PROVIDING SITUATIONAL AWARENESS TO FIRST RESPONDERS", and U.S. Provisional Application No. 62/836,548, filed Apr. 19, 2019, and entitled "SYSTEM FOR PROVIDING SITUATIONAL AWARENESS TO FIRST RESPONDERS", the entire contents of which are incorporated herein by reference in their entirety for all purposes.

TECHNICAL FIELD

The subject matter described herein relates to a communications system for use in a building that can relay both communications data and environmental data, and more particularly to systems and methods for transceiving communications and environmental data for first responders, such as fire fighters, police, rescue personnel, etc.

BACKGROUND

Real-time, accurate and detailed information about an emergency situation, commonly known as situational awareness, can often mean the difference between life and death. In particular, in situations that involve buildings, situational awareness information that includes building layout and the environmental conditions within the building can be important information for first responders to emergency situations. First responders include firefighters, police, emergency medical technicians, incident commanders, building maintenance personnel such as plumbers and HVAC technicians, information technology (IT) specialists such as communications technicians and computer and networking equipment specialists, and the like.

What is needed are systems and methods to provide first responders with fast, accurate and detailed situational awareness around emergency situations in a building, which will enable improved action by first responders on emergency situations.

SUMMARY

In one aspect, a system for providing situational awareness of a building to first responders is described. The system includes a server that receives and stores building information, such as a floor plan and other information. The system further includes one or more sensors that, periodically or aperiodically, or a combination thereof, sense attributes, conditions, state or other factors or situational awareness of the building, and uploads that information to the server. A building identification affixed to the building allows a first responder to access the building information and situational awareness information at any time, such as during an incident or emergency.

In other aspects, a method of providing situational awareness of a building to first responders is described. The systems and methods can be used by any type of first responder, such as fire department personnel, police, or even building maintenance or services personnel or agencies.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

In some embodiments a system comprises an antenna disposed within a building and configured to transceive communication data with one or more separate antennas. One or more environmental sensors are positioned proximate the antenna and are arranged to detect one or more parameters of an environment proximate the antenna, and to transmit the one or more parameters as environmental data to the antenna. A control unit is electrically coupled to the antenna and the one or more environmental sensors, the control unit being configured to transceive the communication data with the antenna and to receive the environmental data from the one or more environmental sensors.

In some embodiments the control unit is configured to transmit the environmental data to a wireless device. In various embodiments the control unit transmits the environmental data to the wireless device via an internet connection that is coupled to a wireless communications system. In some embodiments the wireless device is authenticated via a building identification affixed to or positioned proximate the building. In various embodiments the control unit is electrically coupled to the antenna and to the one or more environmental sensors through a unitary communications coupling. In some embodiments the one or more environmental sensors include at least one of a temperature sensor, an air quality sensor, a smoke sensor, a humidity sensor, a motion sensor, a light sensor, a microphone or a moisture sensor.

In some embodiments the one or more environmental sensors and the antenna are positioned within a common enclosure. In various embodiments the antenna and the one or more environmental sensors are configured to operate at an environmental temperature greater than 200 C. In some embodiments the control unit supplies power to the antenna and to the one or more environmental sensors via a power over Ethernet cable. In various embodiments the one or more separate antennas are antennas of at least one of a LTE band device or a public safety network device.

In some embodiments a system comprises a machine-readable identifier associated with a building, the machine readable identifier encoding information that describes one or more environments of the building. A repeater is connected with the building to relay communication data between one or more base stations and a handset via a communications channel, the repeater configured to receive data from the one or more base stations in a network and relay at least a portion of the received data to the handset through an antenna positioned within the building. One or more environmental sensors are associated with the antenna and are configured for sensing one or more parameters of an environment of the building, the one or more sensors further being configured for transmitting sensor data to the repeater, wherein the repeater is configured to transmit the sensor data to a mobile electronic device outside the building via the antenna.

In some embodiments the mobile electronic device is authenticated to receive the sensor data, the authentication including the mobile electronic device transmitting data from a building identification that is affixed to or positioned proximate the building. In various embodiments the repeater is coupled to the antenna via a communications cable. In some embodiments the one or more environmental sensors transmit the sensor data to the repeater through the communications cable. In various embodiments the repeater supplies power to the one or more environmental sensors via the communications cable. In some embodiments the repeater transmits the sensor data to the mobile electronic device by first transmitting the sensor data to an internet connected device. In various embodiments the one or more environmental sensors include at least one of a temperature sensor, an air quality sensor, a smoke sensor, a humidity sensor, a motion sensor, a light sensor, a microphone or a moisture sensor.

In some embodiments the one or more environmental sensors and the antenna are positioned within a common enclosure. In various embodiments the antenna and the one or more environmental sensors are configured to operate at an environmental temperature greater than 200 C. In some embodiments the repeater is configured to relay the communication data via a public cellular band and via a public safety network.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to situational awareness of a building for a first responder, it should be readily understood that such features are not intended to be limiting. The claims that follow this disclosure are intended to define the scope of the protected subject matter.

Numerous benefits are achieved by way of the present invention over conventional techniques. For example, embodiments of the present invention provide the ability to provide building layout and/or building environmental data to first responders. This data can enable first responders to decrease response times while increasing first responder safety. These and other embodiments of the invention along with many of its advantages and features are described in more detail in conjunction with the text below and attached figures.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Figure 1:
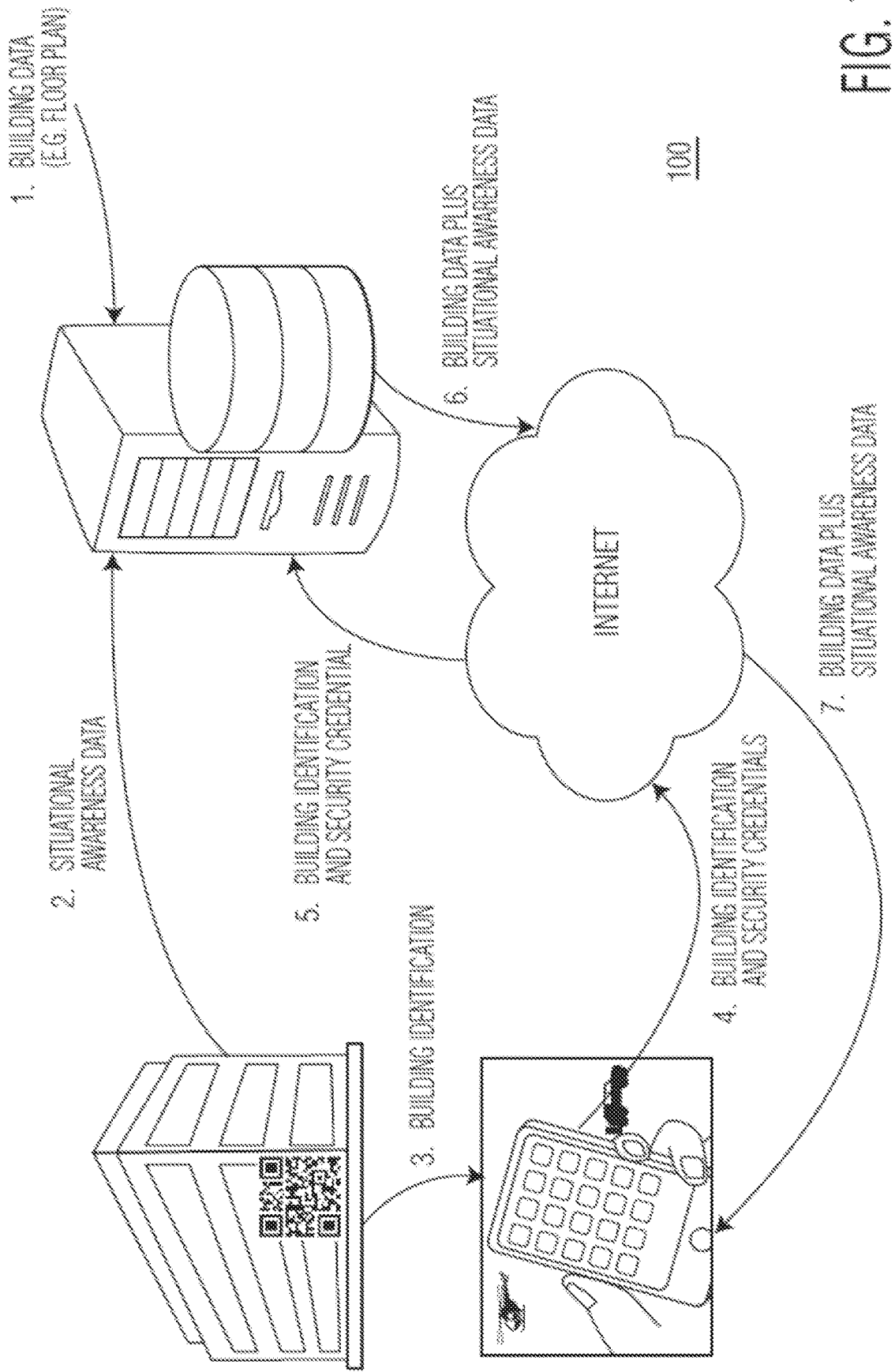
FIG. 1 shows a diagram illustrating aspects of a system showing features consistent with implementations of the current subject matter.

FIG. 1 illustrates a system 100. The system 100 includes a network of one or more sensors 2 to capture situational awareness information inside a building, and a unique, physical building identification 3 affixed to the building. The one or more sensors can include one or more of a temperature sensor, an accelerometer, an optical sensor, and infrared sensor, a LIDAR and/or RADAR sensor, a movement sensor, a pressure sensor, a humidity sensor, a building access monitor, a smoke or other particulate sensor, a biological or other microbial sensor, an air sensor for sensing gasses or pathogenic particulates in the air inside of the building, a geolocation sensor for locating one or more persons, devices or other objects within the building, and the like.

The building identification 3 can be one or more of a QR code or other graphical or digitally-generated, machine-readable code, a machine-readable sign such as one or more alphanumeric characters that can be scanned by a scanning device and determined by an optical character recognition system and/or software, and other identifiers or identifications. The building identification 3 can be affixed to, or proximate the building, such as on a plaque on a wall or outer surface of the building, or affixed to a sign on or near the building, or embedded in a ground area near the building. The affixation can be by glue, bolt, screw, nail, cement, or the like, and is preferably fire-proof or fire resistant, as well as resistant or accommodative to other environmental elements such as rain, wind, humidity, temperature, etc.

In some implementations, the building identification 3 can be printed or painted on an outer wall of the building, or provided as signage on the building. The building identification 3 can be recognized by a sensor, such as a QR code reader or optical scanner, and in some implementations can be sized so as to be recognized and read from a predetermined minimal distance of a first responder, who may employ an optical magnifying device or the like. In yet other implementations, the building identification 3 can be associated with the building in a map application and/or mapping database, alone or in addition to a physical identification, so that a selection and/or read of the building identification 3 on a computing device used by the first responder can access information associated with the building identification. In various implementations the building identification 3 can be transmitted to the first responder via a near-field communications device such as, for example, NFC or BlueTooth. The near-field communications system may receive an ID signal from the first responder and respond by transmitting the building identification 3.

The building identification 3 can store or represent an identification of the building and information about the building, such as floorplan information, a number of occupants (such as a number of current active occupants), HVAC and electrical conduits, location of doors, and the like. The building identification 3 can be used to associate a building identifier with other building-related information and data stored in a database or on a server.

The system 100 further includes a server and/or web based application 4 that stores the building information as well as the situational awareness data collected from the one or more sensors 2, the application 4 allowing access from the server to the building information and situational awareness data 6. The situational awareness data can be collected and/or uploaded to the server on a regular basis, i.e. hourly, daily, or any other regular or irregular period of time. For instance, the situational awareness data can be monitored locally for a change in any selected variable or attribute that exceeds a certain threshold, which can in turn trigger a new collection of one or more data by at least one of the one or more sensors. For example, if an internal temperature of the building rises more than 10 degrees within a predetermined time frame (i.e. 10 minutes), a temperature sensor can collect temperature data and immediately upload that data to the server and/or web application.

The server can be a single server computing machine, a collection of server computing machines, one or more virtual machines, a cloud-based server in a cloud computing infrastructure, or server software being executed on a computing machine. In some implementations, the sensor network 2 is integrated with an in-building radio coverage system. The situational awareness data is stored for immediate analysis and/or analysis at a later stage, including for use in forensic analysis of the events surrounding a situation or an incident.

The system 100 can further include an Artificial Intelligence (AI) module within the server or application to provide real-time guidance to first responders, such as relating to the best course of action to be taken. Further still, at least one of the one or more sensors can include Artificial Intelligence (AI) to allow that sensors to determine, in real-time, alert conditions independent of the server or web based application, for alerting the first responders and/or other sensors and local computing infrastructure.

Figure 2:
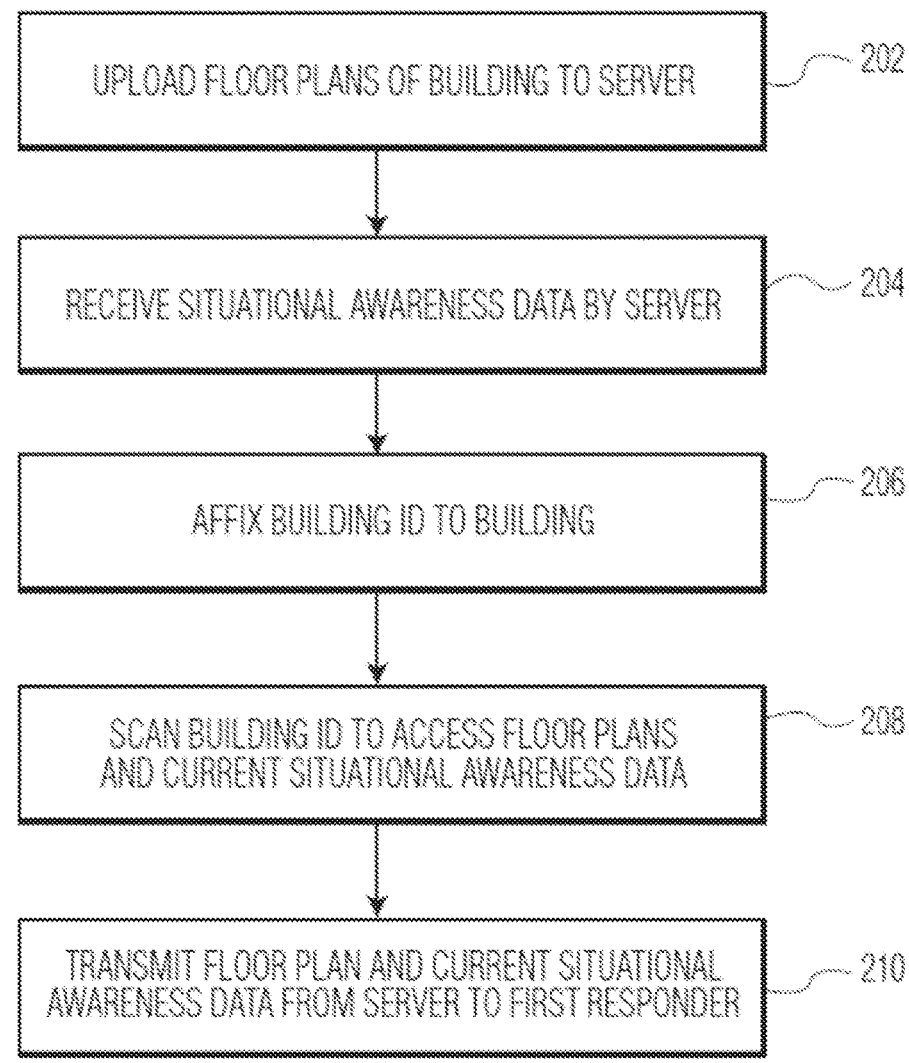
FIG. 2 shows a process flow diagram illustrating aspects of a method having one or more features consistent with implementations of the current subject matter.

FIG. 2 is a flowchart of a method 200 for providing situational awareness to first responders. At 202, floor plans of a building are uploaded to a server. This step can be executed well in advance of an incident or situation. For example, uploading to a server and storage of the floor plans may be part of the process to receive a Certificate of Occupancy for a specific building. Or, such step can be part of a building's safety certification process by a governmental agency. The floor plan data can be encrypted, either by the uploading computer, or by the receiving server and/or application. The floor plan data can be decrypted in a downloading process, such as during an incident or situation related to the building, and only by a first responder with proper credentials or identification, or authority. As used herein, the term first responder can refer to an individual, a group of individuals, an entity such as a Fire Department, Police Department, or other governmental department or agency, or an enterprise such as a commercial security company or other type of company, such as an Information Technology (IT) department of a company that occupies at least some of the building.

The floor plan data can include, without limitation, a plan view of walls, furniture, equipment, and other infrastructure and/or occupants of a floor or part thereof. The floor plan data can also include a representation of the layout and/or location of sensors and controls, such as temperature and lighting controls, smoke alarms, air conditioning vents, baffles, gates, switches, and the like. The floor plan data can further include a catalog of specific materials of objects, such as furniture, carpeting, paint, walls, etc., used in the building.

At 204, a system installed in the building provides situational awareness data to the server where this data is stored and analyzed. The sensor types are described above, and an example of such a system may be a sensor network measuring temperature and air quality, at least in specific areas or regions of the floor plan of the building.

At 206 a Building Identification is affixed to the building in some fashion to uniquely identify the building. An example of a Building Identification could be a "QR Code" that encodes information about the building, such as information unique to the building. It should be noted that this, and other, steps need not be accomplished in the order depicted in FIG. 2, but can be performed in any order. For example, the Building Identification can be affixed to or near the building once the framing of the building is complete, so as to be registrable in a database even before the building is fully built-out. Accordingly, the Building Identification can be scanned or otherwise accessed at any point of the building's life cycle so as to provide identifying information for a first responder irrespective of a current point of that life cycle.

During a situation or an incident, or at any time deemed necessary, at 208 a first responder can access situational awareness information and data about the building by, for example, scanning a QR code that represents the building identifier with a mobile device running a scanning application, and providing login credentials to the mobile device that is connected with a server over a network, to get access to data on the server via the Internet or a secure network such as FirstNet, which is the nationwide broadband network established for use by first responders.

At 210, the building identification and user credentials are sent to the server, which provides access to the building information (such as the floor plan data described above), as well as situational awareness information (also as described above, such as the temperature or air quality at various points inside the building). The building information can be stored in a database associated with the server, or on the server itself. The data is sent from the server back to the first responder, so that they may use this information to enhance decision making. For example, knowing that the environment in a part of the building is conducive to flashover conditions may inform a decision to keep first responders out of this area. The information returned from the server can be augmented by AI, which can enhance the decision-making.

The information can be decrypted and/or formatted in any way, such as a series of graphical elements for display in a graphical user interface on a client computing device, such as a tablet computer, a mobile communication device, a laptop computer, or the like. The information can be prioritized for display to the first responder, such as, for example, highlighting potential fire data in relation to the floor plan over air quality of a different region of the floor plan. In some implementations, a number of graphical tools can provided with the client computing device to allow the first responder to graphically manipulate (i.e. zoom-in, zoom-out, scan sideways, change floor views, etc.) the information being displayed.

Information and data communicated on the system 100 can be transmitted according to any type of protocol or format, and preferably uses high-speed wireless communications. However, the system 100 can utilize any number of communication standards, protocols, and/or technologies, such as WiFi, Bluetooth, or the like. Communication with the first responder can use voice-activated commands, or text-to-speech conversion, so that a first responder can get information audibly and not just visually. Further, the system 100 can utilize haptic controls or feedback by first responders, and utilize other augmented reality (AR) technologies for optimal interaction between the system 100 and first responders. Such interaction can occur through a client application running on a client computing device, such as a smart phone, tablet computer, or the like.

Figure 3:
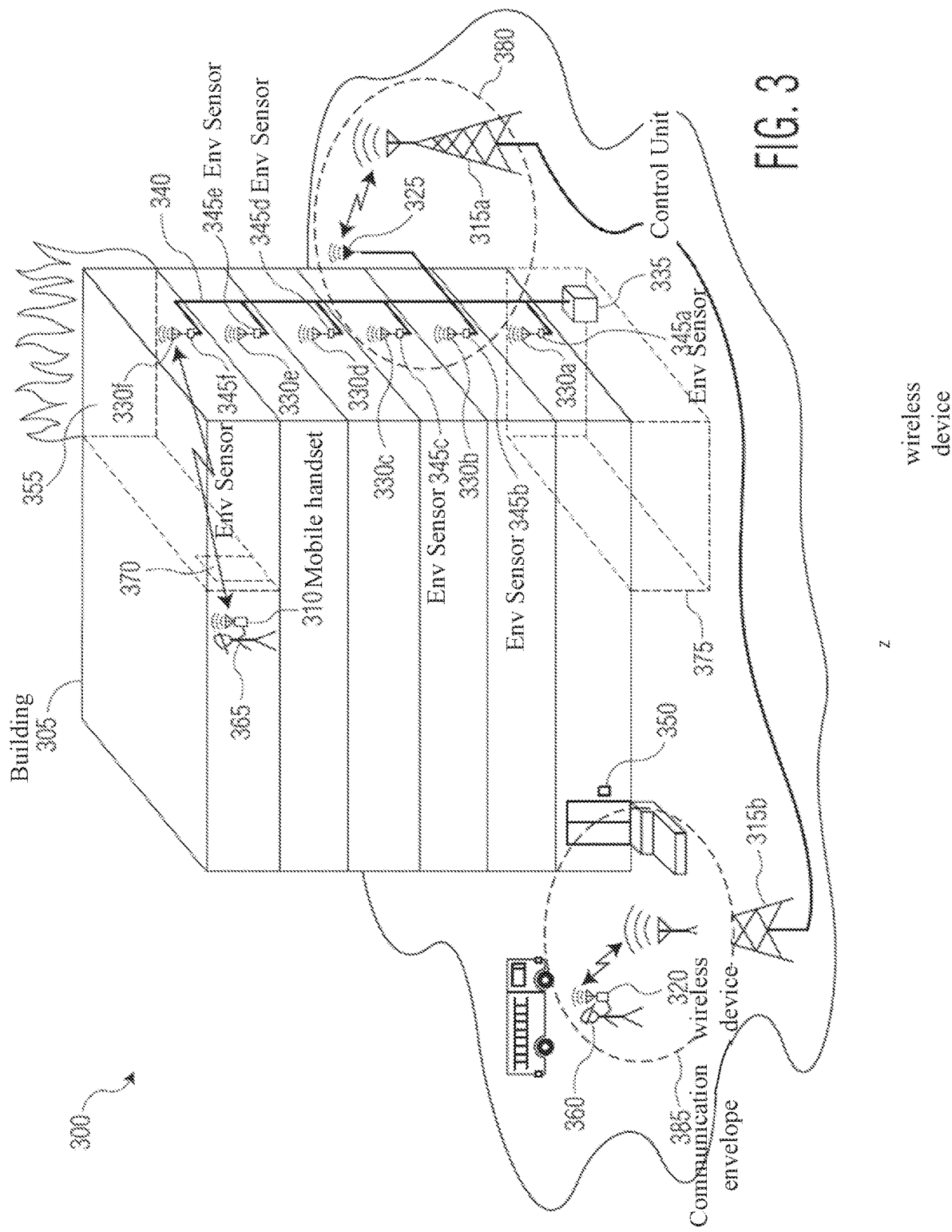
FIG. 3 illustrates a simplified layout of a wireless communications repeater system that includes integrated environmental sensors, according to embodiments of the disclosure.

FIG. 3 illustrates a simplified layout of a wireless communications repeater system 300 that includes integrated environmental sensors, according to embodiments of the disclosure. As shown in FIG. 3, repeater system 300 can be installed in a building 305 and enables a mobile handset 310 to communicate with an external system of base stations 315a, 315b and can also collect environmental data from the building and relay it to a wireless device 320, as described in more detail below.

More specifically, in some embodiments repeater system 300 includes a plurality of antennas positioned within or on building, some of which can be donor antennas 325 for connecting the repeater system to external network of base stations 315a, 315b and some of which can be server antennas 330a-330f for communicating with mobile handset 310 positioned within building 305. Donor antennas 325, and server antennas 330a-330f can be coupled to one or more control units 335 via a communications coupling 340. In some embodiments repeater system 300 can include one or more environmental sensors 345a-345f (e.g., temperature detector, smoke detector, movement detector, etc.) positioned proximate one or more of the plurality of server antennas 330a-330f, and arranged to detect one or more parameters of an environment proximate the respective antenna. The one or more environmental sensors 345a-345f are configured to transmit environmental data acquired by the environmental sensors to control unit 335 via communications coupling 340. In some embodiments the environmental data may be accessible by wireless device 320 that is authenticated via a unique building identification 350 affixed to or positioned proximate building 305, as described in more detail above.

In some embodiments repeater system 300 can be compatible with standard mobile communications (e.g., CDMA, LTE, 2G, 3G, 5G, 6G, etc.) while in further embodiments it can be used for both standard mobile communications in addition to first responder communications that are either prioritized on the same bands as the standard mobile communications or that use one or more dedicated public safety bands (e.g., Band 14). In one example embodiment shown in FIG. 3, room 355 of building 305 is on fire. A site commander 360 is on-site and controls the actions of first responder 365. To assist in directing first responder 365, site commander 360 has wireless device 320 that accesses data for building 305 such as floor plans and/or environmental data from environmental sensors 345a-345f. In some embodiments the environmental data is overlaid on or identified with respective regions of the floorplan data so site commander 360 knows environmental conditions within specific areas of building 305. As described above, in various embodiments wireless device 320 accesses data for building 305 via unique building identification 350, as described more fully above. Although FIG. 3 indicates that site commander 360 is on site, in further embodiments the site commander can access the data and manage the situation remotely. That is, any authorized user can access the building data via the unique building identification 350 and can transfer the access and/or building data on to other first responders, some of whom may be remotely located or anywhere on site.

In one example, as first responder 365 approaches room 355 of building 305, site commander 360 can access environmental data from environmental sensors 345f to determine the conditions within the room before the first responder opens door 370. First responder 365 can communicate with site commander 360 by mobile handset 310 transceiving data with server antenna 330f, or any other server antenna 330a-330e. Server antenna 330f transceives data with control unit 335 via communications coupling 340. Environmental data from environmental sensors 345f are also communicated to control unit 335 via communications coupling 340. In some embodiments control unit 335 is positioned within a fire rated portion 375 of building 305 to protect it from damage from catastrophic events. Control unit 335 transceives data with donor antenna 325 which is within a communications envelope 380 of base station 315a. Base station 315a communicates data with base station 315b. Base station 315b is within a communications envelop 385 and transceives communication data and/or environmental data with wireless device 320 of site commander 360. Using the environmental data, site commander 360 can determine whether areas of building 305 are unsafe, whether there are people within the building, whether there is smoke, etc. and can maneuver first responder 365 accordingly. In some embodiments the environmental data can be accessible by any first responder via remote authentication of their mobile handset and/or by scanning unique building identification 350.

Figure 4:
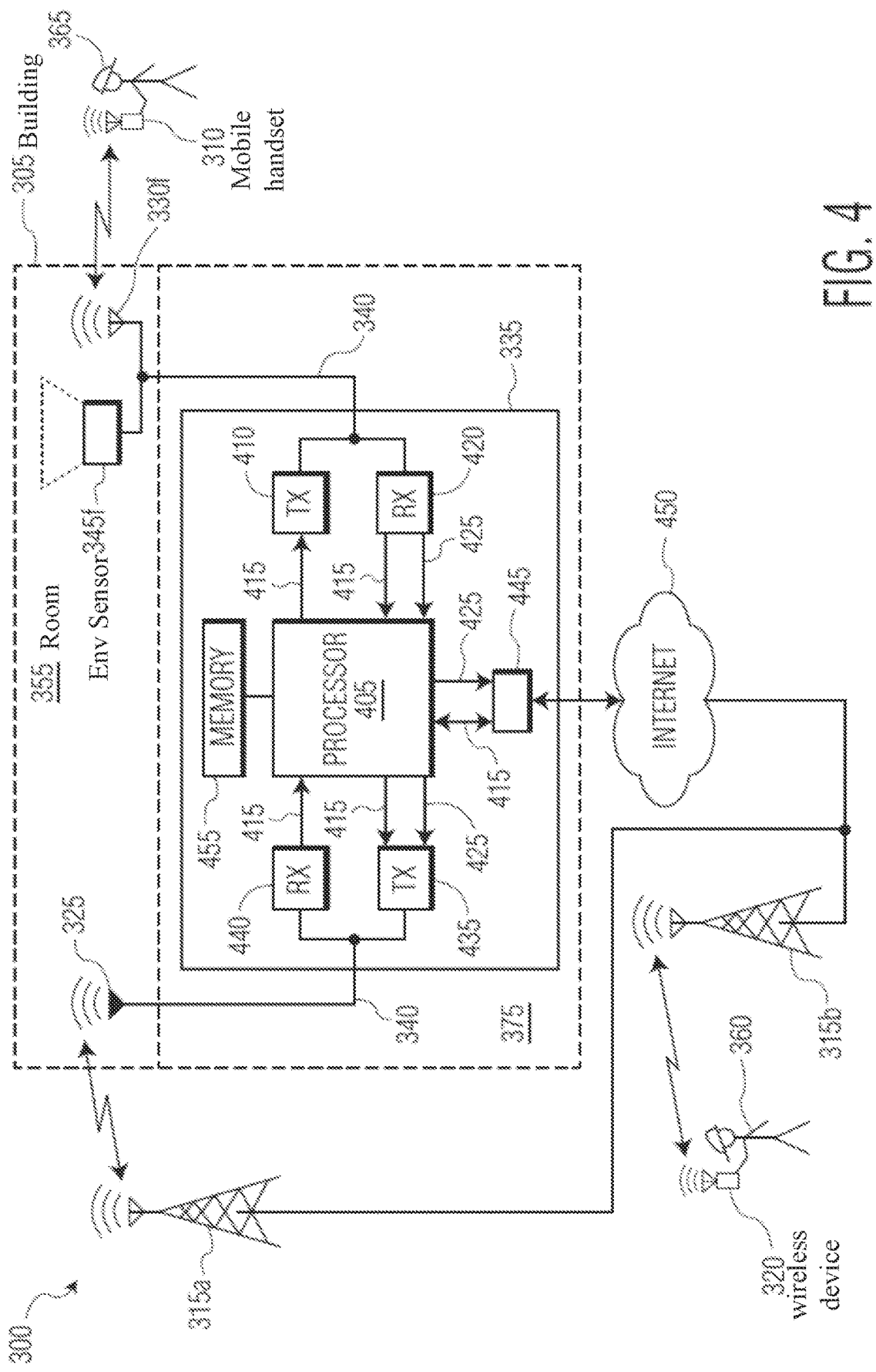
FIG. 4 is a simplified block diagram of the repeater system illustrated in FIG. 3.

FIG. 4 is a simplified block diagram of repeater system 300 illustrated in FIG. 3. As shown in FIG. 3, control unit 335 is shown in greater detail. Control unit 335 includes a processor 405 that is capable of repeating or relaying signals bi-directionally between donor antenna 325 that is communicatively coupled to base station 315a, and server antenna 330f that is communicatively coupled to mobile handset 310. More specifically, control unit 335 includes a first transmitter 410 for transmitting communications data 415 to server antenna 330f and a first receiver 420 for receiving communications data 415 from server antenna 330f and for receiving environmental data 425 from environmental sensors 345f. Control unit 335 also includes a second transmitter 435 for transmitting communications data 415 and/or environmental data 425 to donor antenna 325, and also includes a second receiver 440 for receiving communications data 415 from donor antenna 325. In some embodiments communications coupling 340 can be an Ethernet cable that bi-directionally communicates with environmental sensors 345f and server antenna 330f.

In various embodiments communications coupling 340 can be a power over Ethernet (PoE) cable that provides power from control unit 335 to environmental sensors 345f and/or server antenna 330f and/or donor antenna 325. In further embodiments communications coupling 340 can be any type or combination of wires, coaxial cable, optical fiber, conduit or other suitable data and/or power medium. In various embodiments, processor 405 can transmit environmental data 425 to mobile handset 310 via server antenna 330*f* so first responder 365 can access the environmental data while maneuvering within building 305. In some embodiments mobile handset 310 provides first responder 365 with first responder's position within building 305 (e.g., in a particular room on a particular floor) using positional data acquired from processor 405 and overlays environmental data on the positional data so the first responder, for example, has a color map indicating temperatures in regions of the particular floor.

Processor 405 is also coupled to interface 445 that enables communications data 415 to be bi-directionally exchanged with internet 450 and for environmental data 425 to be transferred to the internet. Internet 450 can be coupled to network of base stations 315*a*, 315*b* through which both communications data 415 and environmental data 425 can be distributed. As used herein, communications data 415 includes any analog voice, digitized voice (e.g., VOIP), text or any other type of communicative data. Environmental data 425 includes any type of analog and/or digital data that indicates one or more environmental conditions within building 305. Processor 405 is also coupled to a memory 455 that can specify repeater system 300 settings or parameters at which to operate the repeater system and can also be used to store historical environmental data 425. In another embodiment control unit 335 can access data from any other system in building 305 (e.g., a fire panel, smoke detectors, heat sensors, door lock sensors, etc.) and can communicate data from one or more of those systems along with environmental data 425.

As described above, in some embodiments environmental data 425 is associated with particular regions of building 305. More specifically, environmental sensors 345*f* can be associated with a top floor of building and similarly environmental sensors 345*a* can be associated with a bottom floor of the building. In some embodiments each environmental sensor 345*a*-345*f* can have a unique identifier that processor 405 recognizes and associates with a particular region of building (e.g., first floor, top floor, room number, hallway designation, etc.). In some embodiments the unique identifier can be a unique code, a unique IP address, a unique position in a data stream, or in response to a unique request from processor 405, or any other suitable method of associating a particular environmental sensor with a particular location of the building. In addition, although only one set of environmental sensors 345*a*-345*f* are shown for each floor of building 305 in FIG. 3, one of skill in the art with the benefit of this disclosure appreciates that any number of sets of environmental sensors can be distributed throughout a building including one set for each room or zone in a building. In further embodiments a repeater system can include more than one controller 335, each of which communicates with a plurality of server and donor antennas. Each of the controllers can be communicatively coupled together such that any antenna can transceive data with any other antenna coupled to the system.

Figure 5:
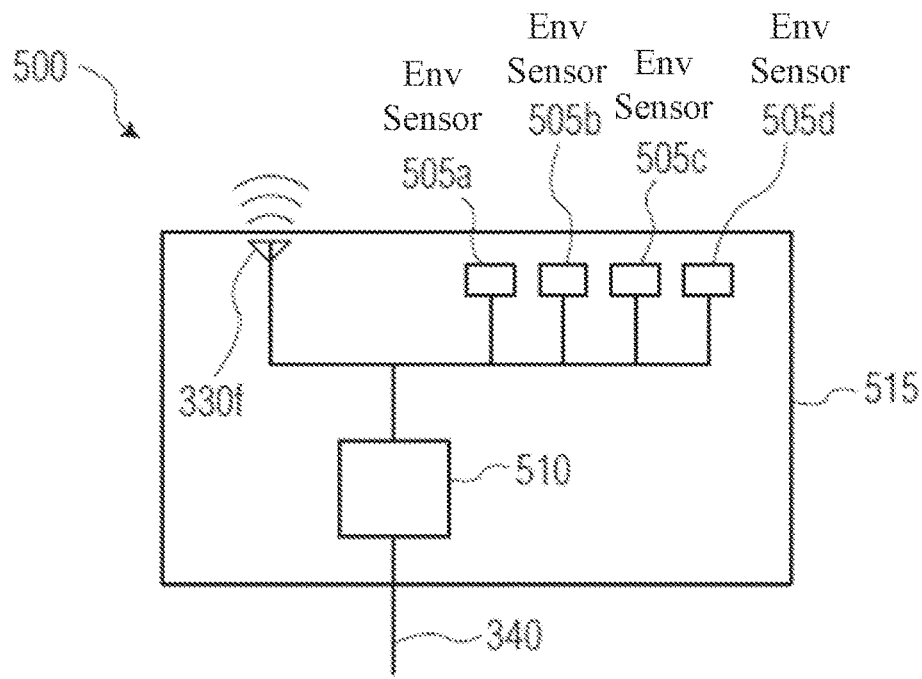
FIG. 5 illustrates a simplified diagram of a combination server antenna/sensor array that can be used with the repeater system illustrated in FIGS. 3 and 4.

FIG. 5 illustrates a simplified diagram of a combination server antenna/sensor array 500, according to some embodiments of the disclosure. As shown in FIG. 5, antenna/sensor array 500 can include a server antenna 330*f* and a plurality of environmental sensors 505*a*-505*d* that are all housed within a common enclosure 515. Also within common enclosure 515 is a communications interface 510 that can be coupled to communications coupling 340. In one embodiment communications interface is an Ethernet enabled device and communications coupling 340 is a PoE cable that supplies power to communications interface 510, environmental sensors 505*a*-505*d* and/or server antenna 330*f*. In some embodiments, enclosure 515, server antenna 330*f* and environmental sensors 505*a*-505*d* can be configured to operate in high temperature environments, such as, above 100 C, above 200 C, above 300 C, above 400 C and/or above 500 C. In various embodiments environmental sensors 505*a*-505*d* can be one or more of a temperature sensor, an air quality sensor, a smoke sensor, a humidity sensor, a motion sensor, a spectrometer, a light sensor, an infra-red light sensor, a microphone or a moisture sensor. In other embodiments power can be supplied to environmental sensors 505*a*-505*d* through a battery within enclosure 515 or via an external power source.

Figure 6:
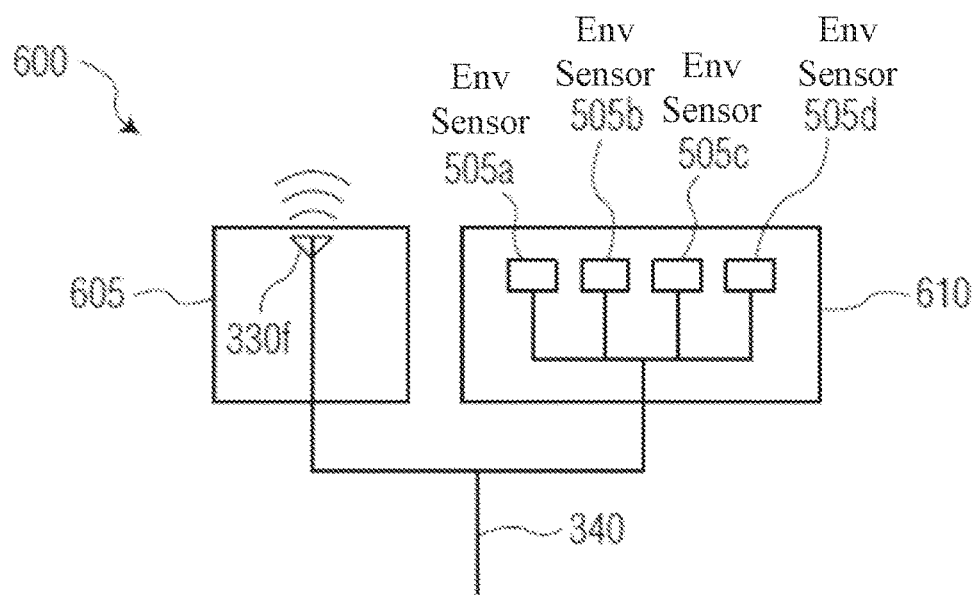
FIG. 6 illustrates a simplified diagram of a server antenna and sensor array that can be used with the repeater system illustrated in FIGS. 3 and 4.

FIG. 6 illustrates a simplified diagram of a server antenna and sensor array 600, according to some embodiments of the disclosure. As shown in FIG. 6, server antenna 330*f* is disposed within a first enclosure 605 and environmental sensors 505*a*-505*d* are disposed within a second enclosure 610. Communications coupling 340 is attached separately to server antenna 330*f* and to environmental sensors 505*a*-505*d*. First and second enclosures, 605, 610, respectively can be configured to operate in high temperature environments, such as, above 100 C, above 200 C, above 300 C, above 400 C and/or above 500 C. In some embodiments environmental sensors 505*a*-505*d* can be one or more of a temperature sensor, an air quality sensor, a smoke sensor, a humidity sensor, a motion sensor, a spectrometer, a light sensor, a microphone or a moisture sensor.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   a machine-readable identifier associated with a building, the machine-readable identifier encoding information that describes one or more environments of the building, the information including a current building layout;
   a server antenna disposed within the building and configured to transceive communication data with one or more separate server antennas;
   one or more building environmental sensors positioned proximate the server antenna and arranged to detect one or more parameters of the one or more environments of the building proximate to the server antenna and within the building,
   at least one donor antenna; and
   a control unit having a processor and a transmitter;
   the control unit electrically coupled to the server antenna and the one or more environmental sensors, the control unit being configured to transceive the communication data with the server antenna and to receive environmental data from the one or more environmental sensors, and further configured to transceive the environmental data with the at least one donor antenna,
   wherein the control unit is positioned separate from the server antenna and the at least one donor antenna, and wherein the processor is coupled to an interface, the interface being arranged to communicate the environmental data bi-directionally and the control unit is configured to transmit the current building layout to a wireless device, the wireless device being configured to read the machine-readable identifier to receive the information that describes the one or more environments of the building including the current building layout, wherein the current building layout corresponding to a layout of the one or more building environmental sensors, and wherein the machine-readable identifier is affixed to or positioned proximate to an outside of the building.

2. The system of claim 1, wherein the control unit is configured to transmit the environmental data to the wireless device.

3. The system of claim 2 wherein the control unit is further configured to transmit the environmental data to the wireless device via an internet connection that is coupled to a wireless communications system.

4. The system of claim 2 wherein the wireless device is authenticated via the machine-readable identifier associated with the building.

5. The system of claim 1 wherein the control unit is electrically coupled to the server antenna and to the one or more environmental sensors through a unitary communications coupling.

6. The system of claim 1 wherein the one or more environmental sensors include at least one of a temperature sensor, an air quality sensor, a smoke sensor, a humidity sensor, a motion sensor, a light sensor, a microphone or a moisture sensor.

7. The system of claim 1 wherein the one or more environmental sensors, the at least one donor antenna, and the server antenna are positioned within a common enclosure.

8. The system of claim 1 wherein the server antenna, the at least one donor antenna, and the one or more environmental sensors are configured to operate at an environmental temperature greater than 200 C.

9. The system of claim 1 wherein the control unit is further configured to supply power to the server antenna, the at least one donor antenna, and to the one or more environmental sensors via a power over Ethernet cable.

10. The system of claim 1 wherein the one or more separate server antennas are antennas of at least one of a long-term evolution (LTE) band device or a public safety network device.

11. A system comprising:
a machine-readable identifier associated with a building, the machine-readable identifier encoding information that describes one or more environments of the building, the information including a current building layout, wherein the machine-readable identifier is affixed to or positioned proximate to an outside of the building;
a repeater connected within the building to relay data between one or more base stations and a handset via a communications channel, the repeater comprising a controller having a processor and a transmitter, wherein the processor is coupled to an interface, the interface being arranged to communicate the data bi-directionally, via one or more donor antennas and one or more server antennas,
wherein the controller is positioned separate from the one or more donor antennas and one or more server antennas, the repeater configured to receive the data from the one or more base stations in a network and relay at least a portion of the received data to the handset through the one or more server antennas positioned within the building; and
one or more building environmental sensors associated with the one or more server antennas and being configured for sensing one or more parameters of the one or more environments within the building, the one or more building environmental sensors further being configured for transmitting sensor data of the data to the repeater, wherein the repeater is configured to transmit the sensor data of the data and the current building layout to a mobile electronic device outside the building via the one or more donor antennas, the mobile electronic device being configured to read the machine-readable identifier to receive the information that describes the one or more environments of the building including the current building layout, wherein the current building layout corresponding to a layout, and a location of each of the one or more building environmental sensors.

12. The system of claim 11 wherein the mobile electronic device is authenticated to receive the sensor data, the authentication including the mobile electronic device transmitting the sensor data from a building identification that is affixed to or positioned proximate the building.

13. The system of claim 11 wherein the repeater is coupled to each of the one or more donor antennas and the one or more server antennas via a communications cable.

14. The system of claim 13 wherein the one or more building environmental sensors transmit the sensor data to the repeater through the communications cable.

15. The system of claim 14 wherein the repeater supplies power to the one or more building environmental sensors via the communications cable.

16. The system of claim 11 wherein the repeater transmits the sensor data to the mobile electronic device by first transmitting the sensor data to an internet connected device.

17. The system of claim 11 wherein the one or more building environmental sensors include at least one of a temperature sensor, an air quality sensor, a smoke sensor, a humidity sensor, a motion sensor, a light sensor, a microphone or a moisture sensor.

18. The system of claim 11 wherein the one or more building environmental sensors, the one or more donor antennas, and the one or more server antennas are positioned within a common enclosure.

19. The system of claim 11 wherein the one or more donor antennas, the one or more server antennas, and the one or more building environmental sensors are configured to operate at an environmental temperature greater than 200 Celsius.

20. The system of claim 11 wherein the repeater is configured to relay the data via a public cellular band and via a public safety network.

* * * * *